US011994818B2

(12) United States Patent
Kaku

(10) Patent No.: US 11,994,818 B2
(45) Date of Patent: May 28, 2024

(54) IMAGE-FORMING APPARATUS

(71) Applicant: SHARP KABUSHIKI KAISHA, Sakai (JP)

(72) Inventor: Yuichi Kaku, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/138,105

(22) Filed: Apr. 23, 2023

(65) Prior Publication Data

US 2023/0341792 A1 Oct. 26, 2023

(30) Foreign Application Priority Data

Apr. 25, 2022 (JP) ................................ 2022-071733

(51) Int. Cl.

| | |
|---|---|
| ***G03G 15/00*** | (2006.01) |
| ***G03G 15/02*** | (2006.01) |
| ***G03G 15/043*** | (2006.01) |
| ***G03G 15/06*** | (2006.01) |
| ***G03G 15/08*** | (2006.01) |

(52) U.S. Cl.

CPC ..... *G03G 15/5033* (2013.01); *G03G 15/0266* (2013.01); *G03G 15/043* (2013.01); *G03G 15/065* (2013.01); *G03G 15/5041* (2013.01); *G03G 15/0855* (2013.01)

(58) Field of Classification Search

CPC ............. G03G 15/0266; G03G 15/043; G03G 15/065; G03G 15/5033; G03G 15/5041; G03G 15/0855

See application file for complete search history.

(56) References Cited

U.S. PATENT DOCUMENTS

2003/0012578 A1* 1/2003 Ishii ................... G03G 15/5041 399/49
2012/0128378 A1* 5/2012 Izumiya ............. G03G 15/5041 399/26
2014/0168677 A1* 6/2014 Mukaibara ............. G03G 15/55 358/1.9

FOREIGN PATENT DOCUMENTS

JP 2019-008094 A 1/2019

* cited by examiner

*Primary Examiner* — Joseph S Wong
(74) *Attorney, Agent, or Firm* — ScienBiziP, P.C.

(57) ABSTRACT

An image-forming apparatus includes: a charge device that comes into contact with a photoreceptor and charges the photoreceptor; a separation mechanism that holds the photoreceptor and the charge device in a separate state that is removable; an exposure device; a developing device that forms a toner image; a toner adhesion amount sensor that detects a toner image; an image quality adjuster that controls a voltage applied to the charge device, a voltage applied to the developing device, an amount of light during exposure, and detection of the toner image and a density of the toner image; and a separation removal confirmer that, with the toner adhesion amount sensor, detects whether a toner image is formed in spite of unexposure during an initialization operation of a image forming process to perform separation removal confirmation as to whether the separate state by the separation mechanism has been removed.

8 Claims, 15 Drawing Sheets

IMAGE-FORMING APPARATUS

CROSS-REFERENCE TO RELATED APPLICATION

The present application claims priority from Japanese Application JP2022-071733, the content of which is hereby incorporated by reference into this application.

BACKGROUND OF THE INVENTION

1. Field of the Invention

The present disclosure relates to an image-forming apparatus including a charge roller and a toner adhesion amount sensor.

2. Description of the Related Art

In some image-forming apparatuses where a charge roller charges a photoreceptor, which is an image carrier, a mechanism (hereinafter referred to as separation mechanism) is provided to separate the photoreceptor and the charge roller in a removable manner so that the photoreceptor and the charge roller are prevented from being in physical contact with each other when the image-forming apparatus is shipped from a factory. Furthermore, in some image-forming apparatuses where the photoreceptor and the charge roller are configured as a replaceable unit (hereinafter referred to as process unit), a removable separation mechanism similar to the one described above is provided to prevent the photoreceptor and the charge roller from being in physical contact with each other when the process unit for replacement is shipped from the factory. This is to avoid the effect on the image quality when the photoreceptor is continuously pressed by the charge roller and accordingly the corresponding area of the photoreceptor gets damaged physically or chemically.

However, in order to form images, it is necessary to bring the charge roller into contact with the photoreceptor to charge the surface of the photoreceptor. Therefore, a removal mechanism is provided for the separation mechanism to remove the separation and bring the charge roller into contact with the photoreceptor.

When an operation failure occurs in the removal mechanism, the charge roller and the photoreceptor remain separated. This results in a state where the photoreceptor is not charged during an image forming operation. Today, in typical electrophotographic image-forming apparatuses that form (also referred to as "develop") toner images on the photoreceptor, toner selectively adheres to areas (exposed areas in a normal situation) where the photoreceptor is not charged. Therefore, when the removal mechanism does not operate, the charge roller remains separated, and the photoreceptor is not charged, a toner image (solid image) is formed over the entire surface of the photoreceptor instead of the toner image that is supposed to be formed with the toner adhering exclusively to exposed areas, which results in unnecessary toner consumption. As a result, the area around the photoreceptor may become contaminated with scattered toner.

Therefore, a conventional technique has been discussed, which includes a determiner that determines a separate state between the charge roller and the photosensitive drum after the start of use.

The conventional technique includes an image carrier (photoreceptor), a charger (charge roller), a separator that separates the photoreceptor and the charger before the start of use and brings the photoreceptor and the charger into contact with each other after the start of use, and a determiner. The determiner applies a first bias lower than that for charging the image carrier by the charger and determines the separate state of a process cartridge (whether the process cartridge is new in the separate state or unmounted or is old after separation removal) based on the value of the current flowing at that time. When it is determined that the process cartridge is new or unmounted, a second bias greater than the first bias is further applied, and it is determined whether the process cartridge is new or unmounted based on the value of the current flowing in the charger at that time.

SUMMARY OF THE INVENTION

According to the conventional technique, it is determined whether the process cartridge is old, new, or unmounted based on the magnitude of the current flowing when the voltage is applied to the charger, but for this purpose, there is a need to provide a current detection circuit that detects the magnitude of the current flowing in the charger.

One aspect of the present disclosure has been made in consideration of the above circumstances and provides a technique that may ensure to determine the removal of the separate state without providing a dedicated detection circuit and a technique that may reduce wasteful toner consumption and contamination due to separation removal failures.

One aspect of the present disclosure is to provide an image-forming apparatus including a charge device that comes into contact with a photoreceptor for an image forming process and charges the photoreceptor in a state where a voltage is applied, a separation mechanism that holds the photoreceptor and the charge device in a separate state that is removable, an exposure device that exposes the photoreceptor, a developing device that forms a toner image on a surface of the photoreceptor in a state where a voltage is applied, a toner adhesion amount sensor that detects a toner image formed on the surface of the photoreceptor to adjust an image quality, an image quality adjuster that controls a voltage applied to the charge device, a voltage applied to the developing device, an amount of light during exposure with the exposure device, and detection of the toner image and a density of the toner image with the toner adhesion amount sensor, and a separation removal confirmer that, with the toner adhesion amount sensor, detects whether a toner image is formed in spite of unexposure in a state where a voltage is applied to the charge device and the developing device during an initialization operation of the image forming process at a start time of use to thus perform separation removal confirmation as to whether the separate state by the separation mechanism has been removed.

In the image-forming apparatus according to one aspect of the present disclosure, the separation removal confirmer detects, with the toner adhesion amount sensor for image quality adjustment, whether a toner image is formed in spite of unexposure in a state where a voltage is applied to the charge device and the developing device during the initialization operation of the image forming process at the start time of use to thus perform separation removal confirmation as to whether the separate state by the separation mechanism has been removed; thus, it is possible to provide a technique that may ensure to determine the removal of the separate state without providing a dedicated detection circuit and may reduce wasteful toner consumption and contamination due to separation removal failures.

DETAILED DESCRIPTION OF THE INVENTION

A detailed description will be further given below on the present disclosure with reference to the drawings. The description below is illustrative in all respects and should not be construed to limit the present disclosure.

First Embodiment

Configuration Example of Image-Forming Apparatus

Figure 1:
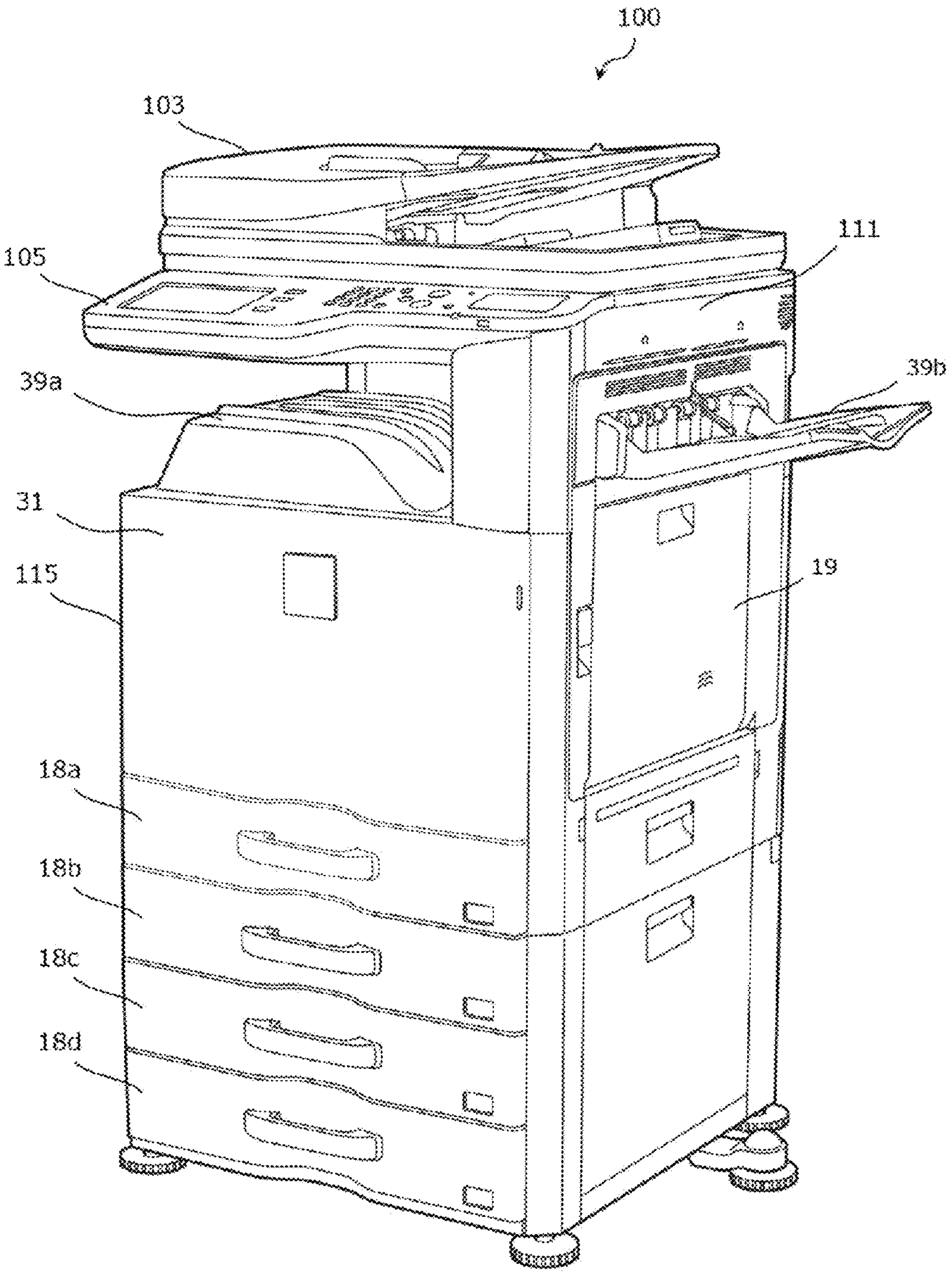
FIG. 1 is a perspective view illustrating an external appearance of a digital multifunction peripheral that is one embodiment of an image-forming apparatus according to the present disclosure.
Figure 2:
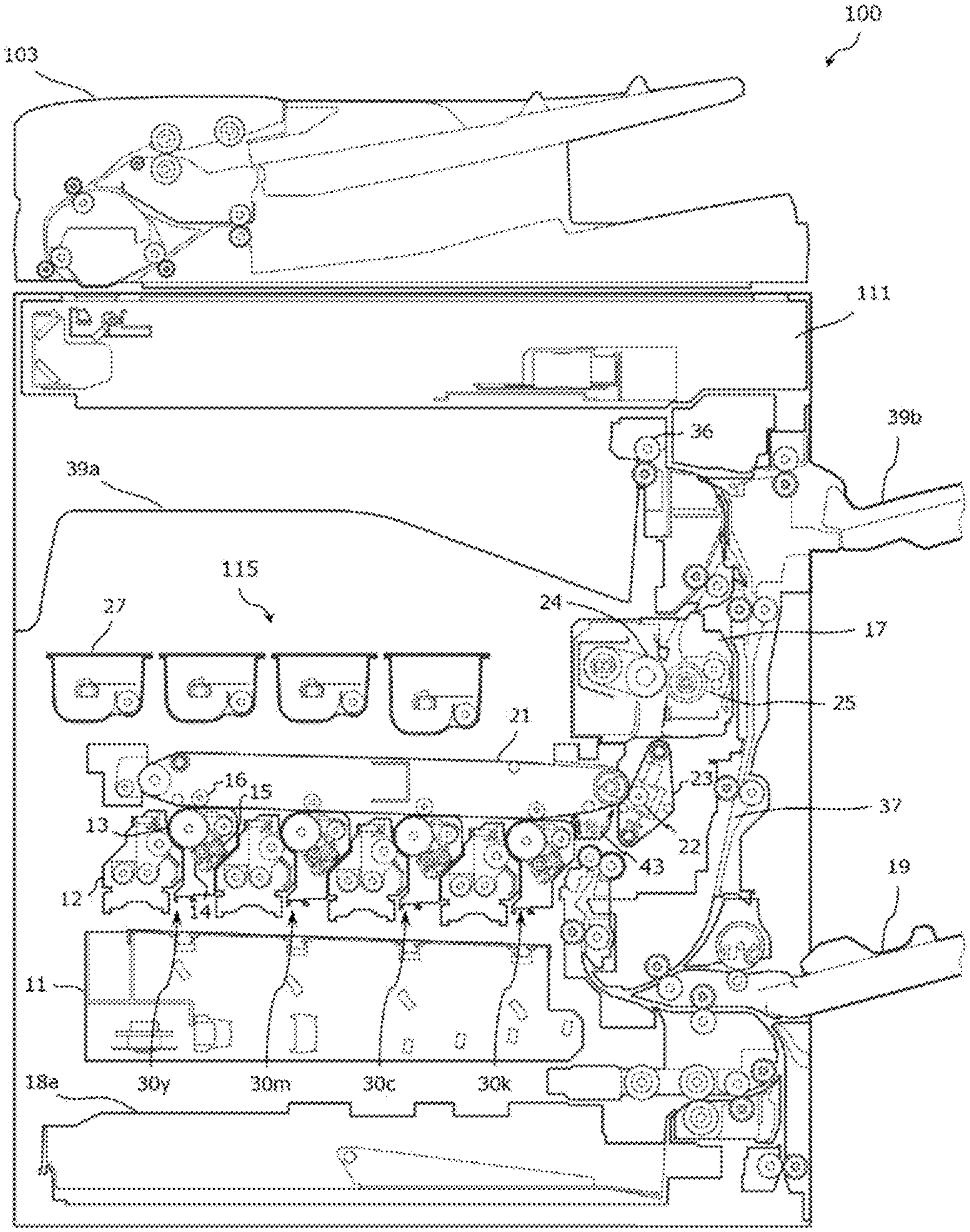
FIG. 2 is a diagram illustrating an internal structure of a multifunction peripheral illustrated in FIG. 1 for image formation.
Figure 3:
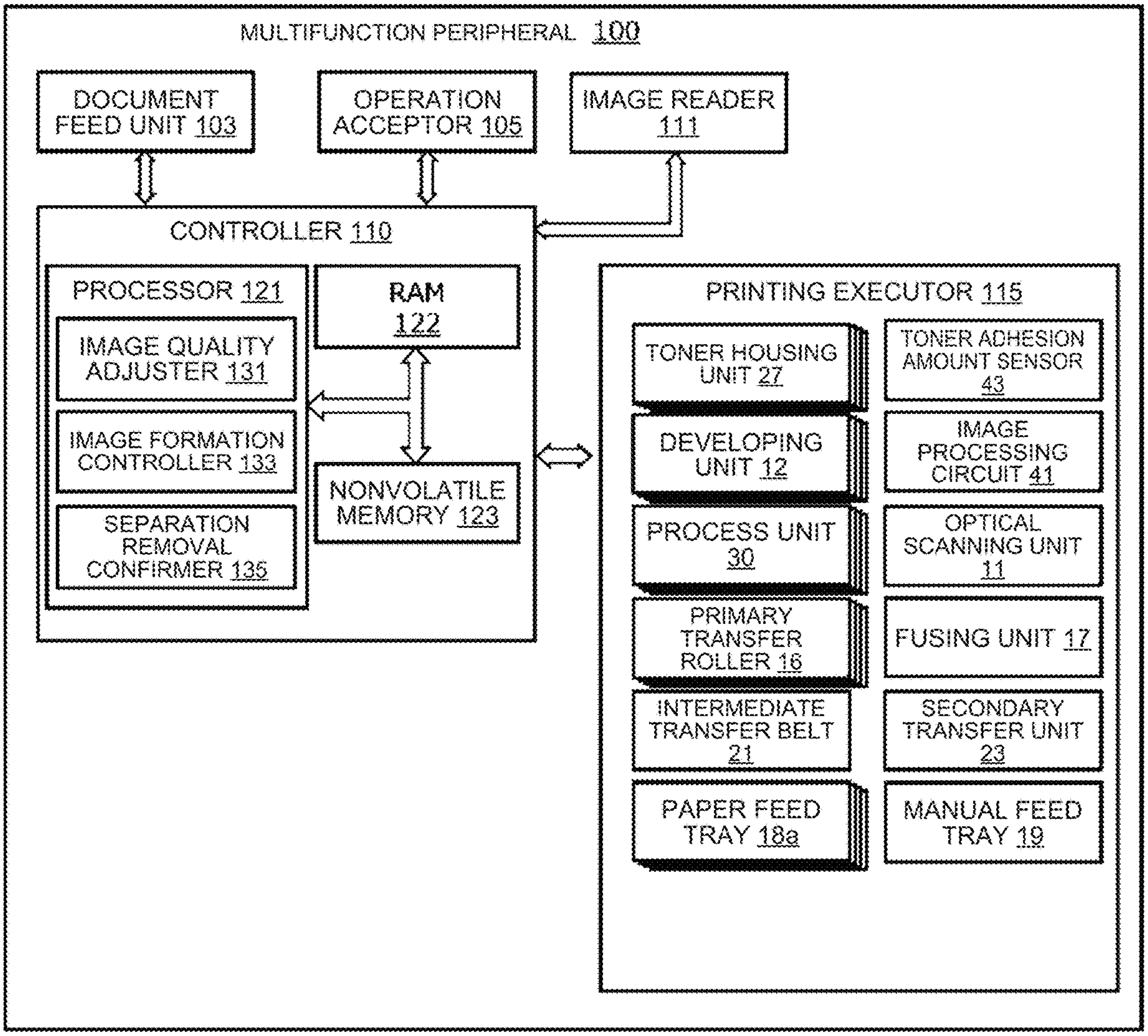
FIG. 3 is a block diagram illustrating elements related to control in the multifunction peripheral illustrated in FIG. 1.

FIG. 1 is a perspective view illustrating an external appearance of a digital multifunction peripheral that is one embodiment of the image-forming apparatus according to the present disclosure. FIG. 2 is a diagram illustrating an internal structure of a multifunction peripheral 100 illustrated in FIG. 1 for image formation. FIG. 3 is a block diagram illustrating elements related to control by a controller 110 illustrated in FIG. 1.

As illustrated in FIG. 1, the multifunction peripheral 100 includes, in its main body, an image reader 111 that reads documents, an operation acceptor 105 that accepts user operations, and a printing executer 115 that forms images. Further, a paper feed tray 18*a* is provided below the printing executer 115. A discharge tray 39*a* is provided above the printing executer 115 and below the image reader 111, and a discharge tray 39*b* is provided on a right surface portion. On the front side, there is a front cover 31 that is a main body cover that may be opened and closed. FIG. 1 illustrates a state where the front cover is closed.

On top of the main body, a document feed unit 103 is provided to feed documents to a reader.

Under the main body, a paper feed desk including three paper feed trays 18*b*, 18*c*, and 18*d* is provided to accommodate print sheets.

Here, the internal configuration of the multifunction peripheral 100 illustrated in FIG. 2 for image formation will be described.

The multifunction peripheral 100 forms four-color toner images of yellow (Y), magenta (M), cyan (C), and black (K) using an electrophotographic process, overlays the toner images on an intermediate transfer belt 21, and prints a color image on a print sheet. Alternatively, a monochrome image using a single color (e.g., black) is printed on a print sheet. For this purpose, the printing executer 115 includes four process units 30 each including therein a developing unit 12, a photosensitive drum 13, a charge roller 14, a drum cleaner 15, and the like. The process unit includes the photosensitive drum 13 and the charge roller 14. An optical scanning unit 11 is provided to expose and scan the photosensitive drum 13 corresponding to each color with a laser beam.

The multifunction peripheral 100 includes process units 30*y*, 30*m*, 30*c*, and 30*k* for the respective colors, but in FIG. 2, only the components of the yellow process unit 30*y* are denoted by reference numerals, and the components for the other colors are omitted. The process units may also be referred to as the process unit 30 using a representative reference numeral. It should be understood that the description using the representative reference numerals is applied to the Y, M, C, and K colors.

According to the present embodiment, the process unit 30 is configured as a consumable unit that is replaceable as a single unit. This enables easy replacement of consumables such as the photosensitive drum 13 included in the process unit 30.

The multifunction peripheral 100 further includes an image processing circuit 41 that generates input signals to the optical scanning unit 11 (see FIG. 3). The image processing circuit 41 processes the image data on the document read by the image reader 111 to generate exposure data regarding the exposure pattern for the photosensitive drum

13. The exposure data corresponds to the pattern of the electrostatic latent image to be formed on the surface of the photosensitive drum 13.

Under the control of an image formation controller 133 illustrated in FIG. 3, the toner image of any of Y, M, C, and K is formed on the photosensitive drum 13 through the electrophotographic process including cleaning by the drum cleaner 15, charging by the charge roller 14, exposure by the optical scanning unit 11, and development by the developing unit 12.

A primary transfer roller 16 is provided in a position in contact with the photosensitive drum 13 of the process unit 30 through the intermediate transfer belt 21. The image formation controller 133 applies a voltage to the primary transfer roller 16 to transfer the Y, M, C, and K toner images formed on the photosensitive drum 13 onto the intermediate transfer belt 21 in a superimposed manner and delivers the toner images to the position in contact with a secondary transfer unit 23. The image formation controller 133 drives the secondary transfer unit 23 and also applies a voltage to transfer the toner images to a print sheet fed from the paper feed tray 18*a*, etc.

A toner adhesion amount sensor 43 is provided at a position in front of the secondary transfer unit 23 so as to face the intermediate transfer belt 21 moving from the primary transfer roller 16 to the secondary transfer unit 23. According to the present embodiment, the toner adhesion amount sensor 43 is a reflective optical sensor that detects the toner adhesion amount of the toner image transferred to the intermediate transfer belt 21.

The image formation controller 133 controls the printing executer 115 to form adjustment toner patches of the Y, M, C, and K colors and detects the density of the formed toner patches with the toner adhesion amount sensor 43. At least any of the voltage applied to the charge roller 14 corresponding to each color, the voltage applied to the developing unit 12, and the intensity of the laser beam emitted from the optical scanning unit 11 to the photosensitive drum 13 is adjusted. By the adjustment, the image quality is adjusted to obtain a desirable image.

Further, the image formation controller 133 feeds and transports print sheets from the paper feed tray 18*a* of the main body, the paper feed trays 18*b*, 18*c*, and 18*d* of the paper feed desk (not illustrated in FIG. 2), and a manual feed tray 19. The manual feed tray 19 may be folded and stored in the main body when not in use, as illustrated in FIG. 1.

The image formation controller 133 feeds the print sheet, onto which the toner image has been transferred by the secondary transfer unit 23, to a fusing unit 17. A heating roller 24 and a pressure roller 25 of the fusing unit 17 heat and pressurize the print sheet passing therebetween to fuse the toner image, which has been transferred to the print sheet, on the print sheet. The image formation controller 133 drives the fusing unit 17 to control the heating temperature of the heating roller 24.

The image formation controller 133 causes the print sheet having passed through the fusing unit 17 to be discharged to the discharge tray 39*a*. Alternatively, the print sheet is switched back once by a discharge roller 36 and discharged to the discharge tray 39*b* on the right surface portion. Alternatively, the print sheet that is switched back is led to a double-sided feed path 37 and returned to the secondary transfer unit 23. The toner image is then transferred to the back side of the print sheet, and the print sheet is discharged through the fusing unit 17 to the discharge tray 39*a* or 39*b*.

As illustrated in FIG. 3, the controller 110 includes devices such as a processor 121, a RAM 122, and a nonvolatile memory 123 as hardware resources. The processor 121 executes a control program previously stored in the nonvolatile memory 123 and works with the hardware resources to perform functions as the controller 110. The controller 110 includes an image quality adjuster 131, the image formation controller 133, and a separation removal confirmer 135.

Figure 4:
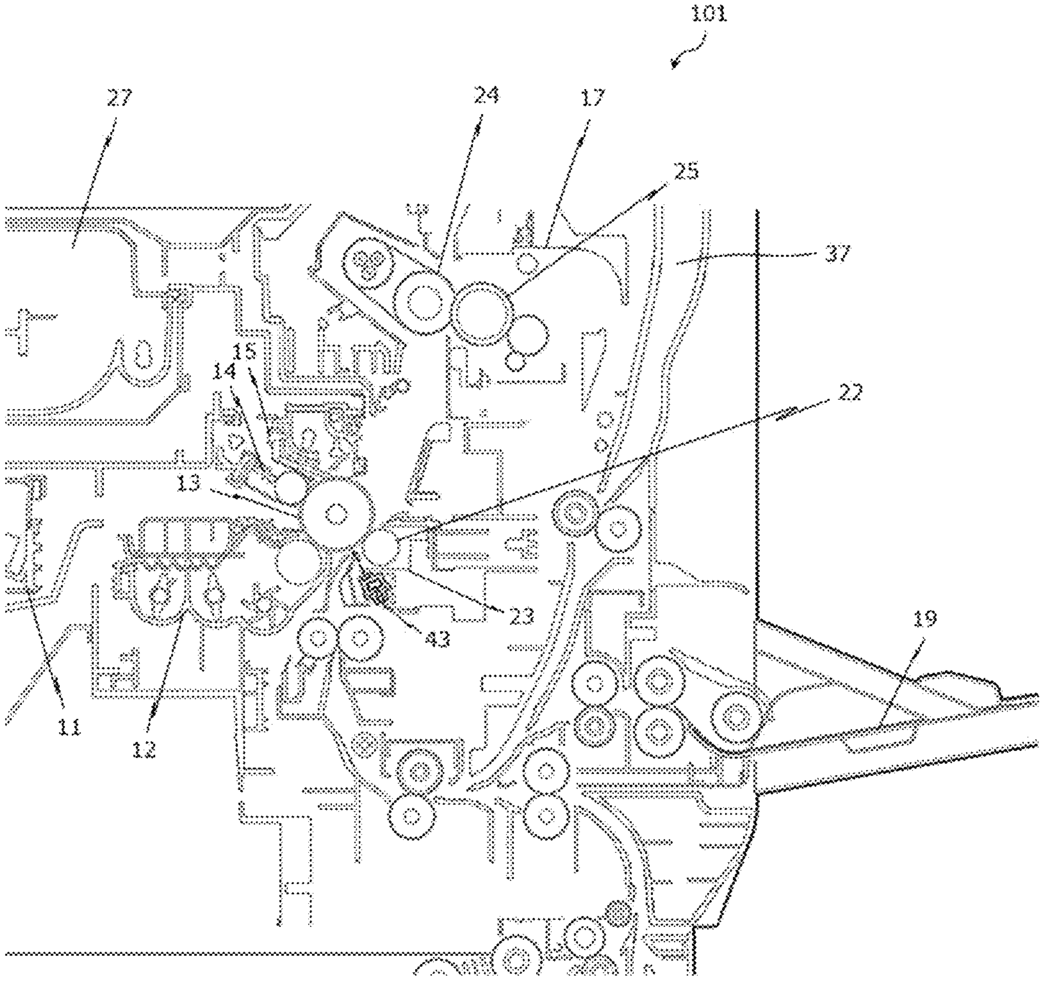
FIG. 4 is a diagram illustrating an internal structure of a multifunction peripheral that performs monochrome image formation that is a different embodiment of the image-forming apparatus according to the present disclosure.

FIG. 2 illustrates an example of the configuration of the color multifunction peripheral that superimposes four-color toner images to form a color image. Conversely, FIG. 4 illustrates an example of a printing executer of a monochrome multifunction peripheral that forms monochrome images. A multifunction peripheral 101 illustrated in FIG. 4 prints monochrome images using black toner on print paper. The units corresponding to the multifunction peripheral 100 illustrated in FIG. 2 are denoted by the same reference numerals as those in FIG. 2. The printing executer includes the optical scanning unit 11, the developing unit 12, the photosensitive drum 13, the charge roller 14, the drum cleaner 15, the fusing unit 17, and the toner adhesion amount sensor 43.

The block diagram corresponding to FIG. 3 is omitted for the multifunction peripheral 101 illustrated in FIG. 4, but the primary transfer roller 16, the intermediate transfer belt 21, and the secondary transfer unit 23 illustrated in FIG. 3 are not provided. Instead, a transfer unit 23 is provided to transfer the toner image of the photosensitive drum 13 onto a print sheet. One toner housing unit 27, the one developing unit 12, and the one process unit 30 are provided for the black toner. Other configurations are the same as those in FIG. 3. The transfer unit 23 includes a transfer roller 22.

The image formation controller 133 illustrated in FIG. 3 controls the printing executer 115 to form an adjustment toner patch. The density of the formed toner patch is detected by the toner adhesion amount sensor 43, and at least any of the voltage applied to the charge roller 14, the voltage applied to the developing unit 12, and the intensity of the laser beam emitted from the optical scanning unit 11 to the photosensitive drum 13 is adjusted to adjust the image quality so as to obtain a desirable image.

The image formation controller 133 illustrated in FIG. 3 forms a toner image of black toner on the photosensitive drum 13. Then, the voltage is applied to the secondary transfer roller 22 of the transfer unit 23 to transfer the black toner image formed on the photosensitive drum 13 to a print sheet fed from the paper feed tray 18*a*, or the like. The toner adhesion amount sensor 43 is provided at a position in front of the transfer unit 23 so as to face the photosensitive drum 13 that moves from the developing unit 12, which is provided to face the photosensitive drum 13, to the transfer unit 23. The toner adhesion amount sensor 43 detects the toner adhesion amount of the toner image formed on the photosensitive drum 13.

The image quality adjuster 131 controls the printing executer 115 to form an adjustment toner patch and detects the density of the formed toner patch with the toner adhesion amount sensor 43. At least any of the voltage applied to the charge roller 14, the voltage applied to the developing unit 12, and the intensity of the laser beam emitted from the optical scanning unit 11 to the photosensitive drum 13 is then adjusted. By the adjustment, the image quality is adjusted to obtain a desirable image during image formation by the image formation controller 133.

The separation removal confirmer 135 then performs a process for separate state confirmation as described below.

Separation Mechanism and Removal Mechanism For Charge Roller and Photoreceptor

Before describing the process for separate state confirmation, specific examples of the separation mechanism and the removal mechanism in the multifunction peripheral according to the present embodiment are described.

The color multifunction peripheral illustrated in FIG. 2 is described as an example below, but the same mechanisms are applied to the monochrome multifunction peripheral illustrated in FIG. 4.

Figure 5:
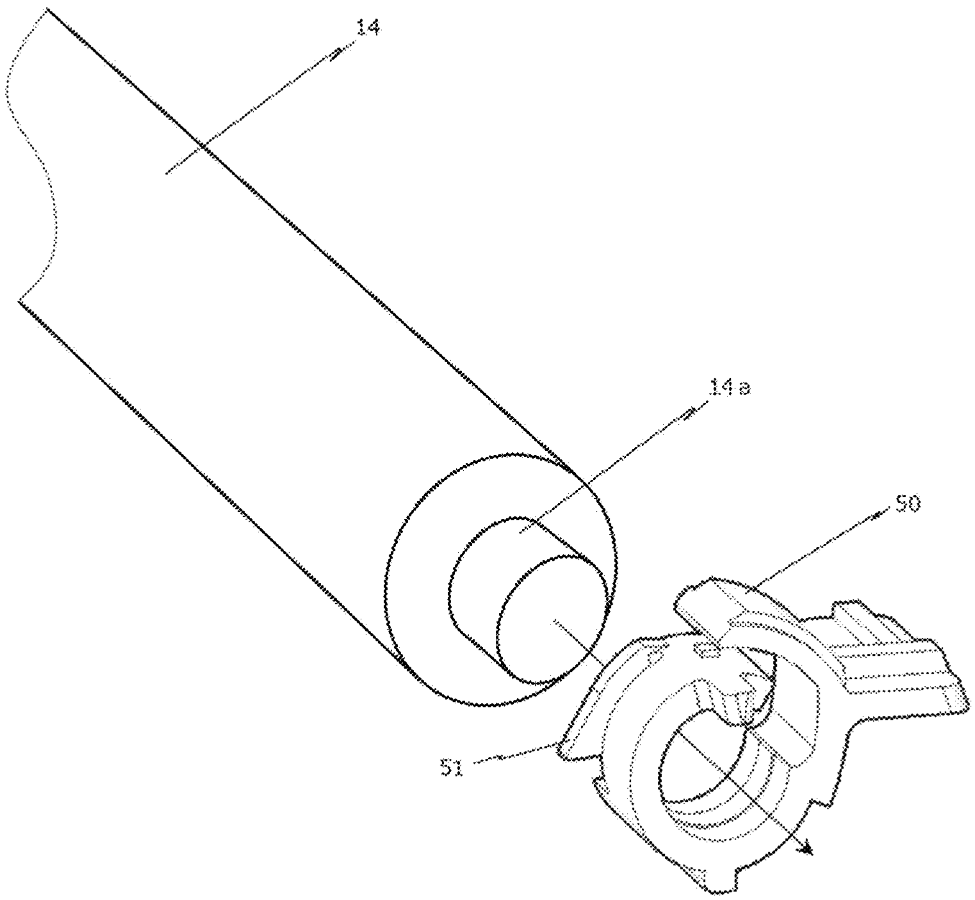
FIG. 5 is an assembly diagram illustrating an example of a separation cam that is one of primary components of a separation mechanism of the multifunction peripheral illustrated in FIG. 2 and that is mounted on the front side of a charge roller.

FIG. 5 is an assembly diagram illustrating an example of a separation cam that is one of the primary components of the separation mechanism of the multifunction peripheral illustrated in FIG. 2 and that is mounted on the front side of the charge roller 14 (in FIG. 1, the side where handles of the operation acceptor 105 and the paper feed trays 18*a* to 18*d* are provided, or the near side). Correspondingly, FIG. 6 is an assembly diagram illustrating an example of a separation cam mounted on the rear side of the charge roller 14 (the back side opposite to the near side in FIG. 1).

Figure 6:
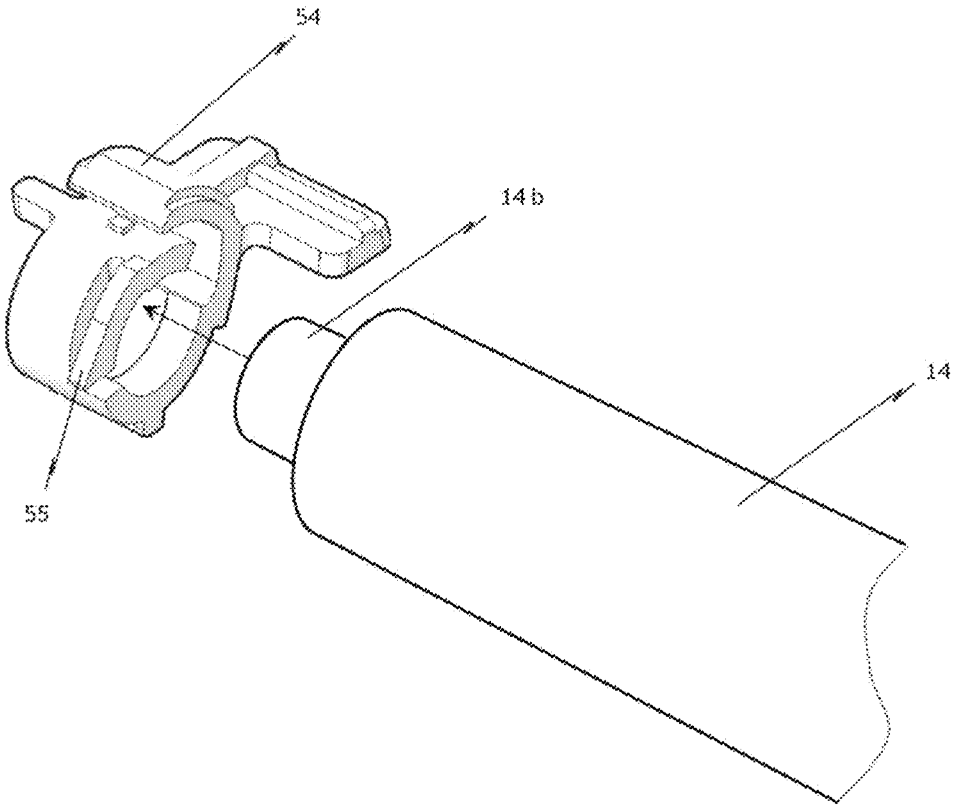
FIG. 6 is an assembly diagram illustrating an example of a separation cam that is one of the primary components of the separation mechanism of the multifunction peripheral illustrated in FIG. 2 and that is mounted on the rear side of the charge roller.

As illustrated in FIGS. 5 and 6, substantially spiral separation cams 50 and 54 are rotatably engaged with a front shaft 14*a* and a rear shaft 14*b* of the charge roller 14, respectively. The separation cam 50 on the front side includes a rib 51 at an inner end of the spiral, and an outer end functions as a spacer that holds a separate state. The separation cam 54 on the rear side also includes a rib 55 at an inner end of the spiral, and an outer end functions as a spacer that holds a separate state.

Figure 7A:
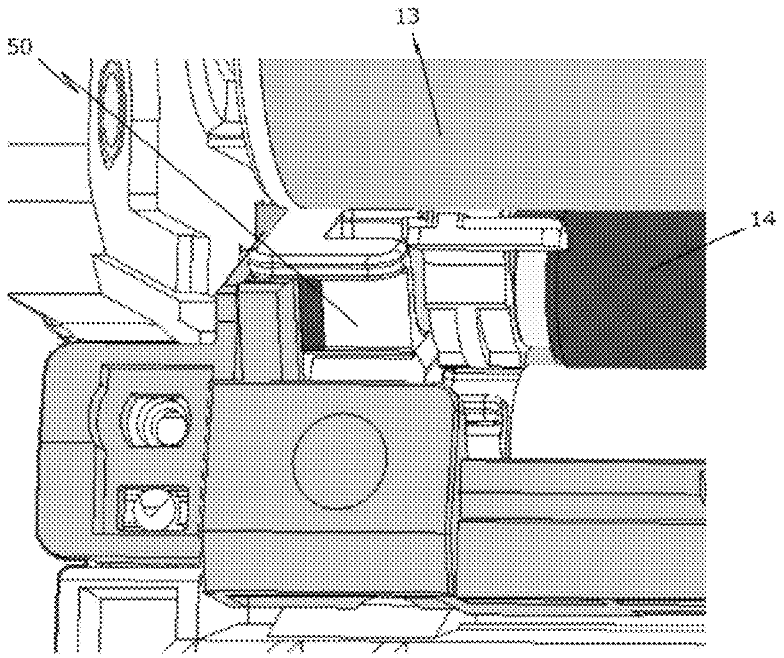
FIGS. 7A and 7B illustrate the position of the separation cam on the front side illustrated in FIG. 5 in a separate state.

FIGS. 7A to 10B are diagrams illustrating positions of the separation cams in the separate state and the separation removal state. FIGS. 7A and 7B illustrate the position of the separation cam 50 on the front side in the separate state. FIG. 7A is a perspective view, and FIG. 7B is a cross-sectional view illustrating the plane perpendicular to the axis of the charge roller 14.

Figure 7B:
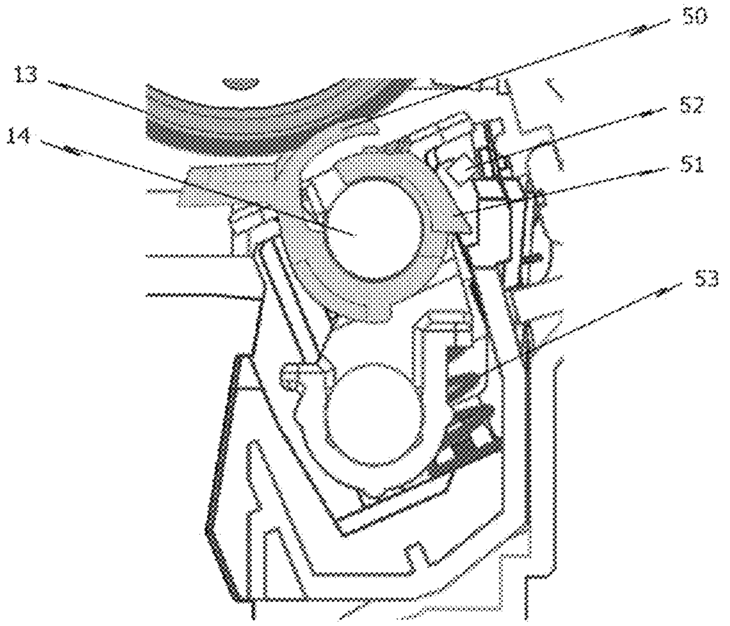
Figure 8A:
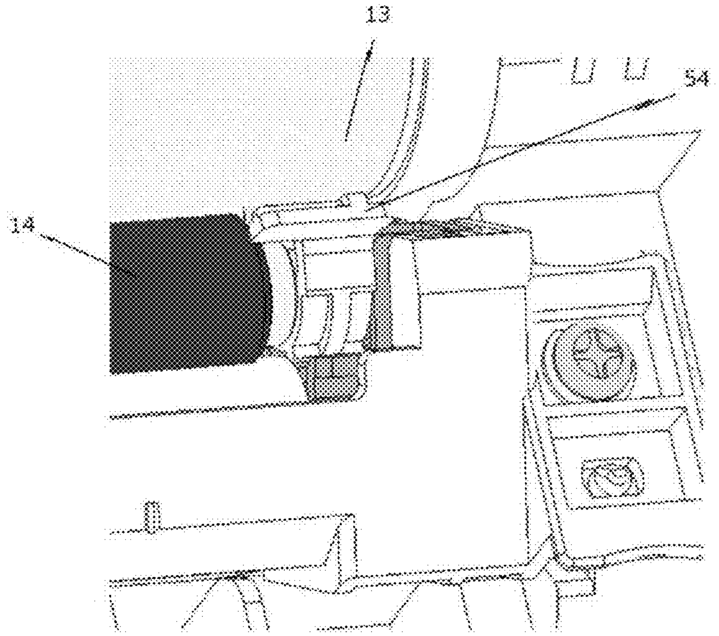
FIGS. 8A and 8B illustrate the position of the separation cam on the rear side illustrated in FIG. 6 in a separate state.
Figure 8B:
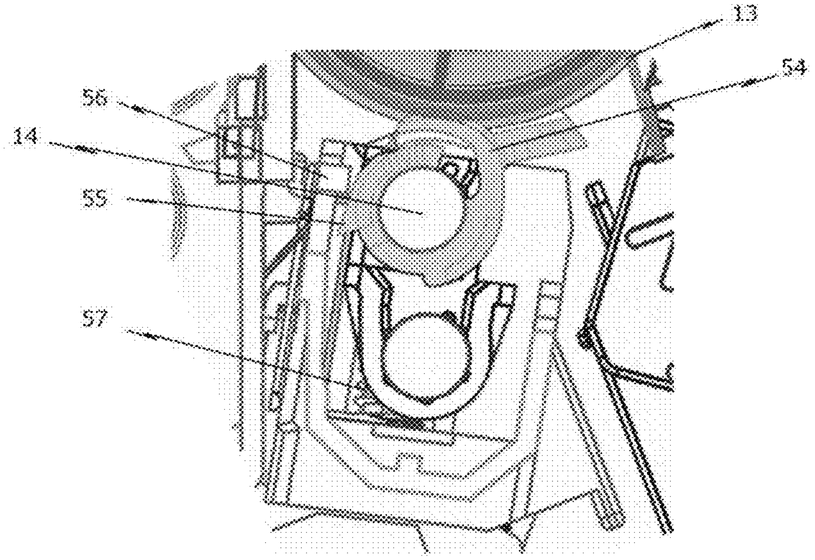

FIGS. 8A and 8B illustrate the position of the separation cam 54 on the rear side in the separate state. FIGS. 8A and 8B are the same as FIGS. 7A and 7B.

Figure 9A:
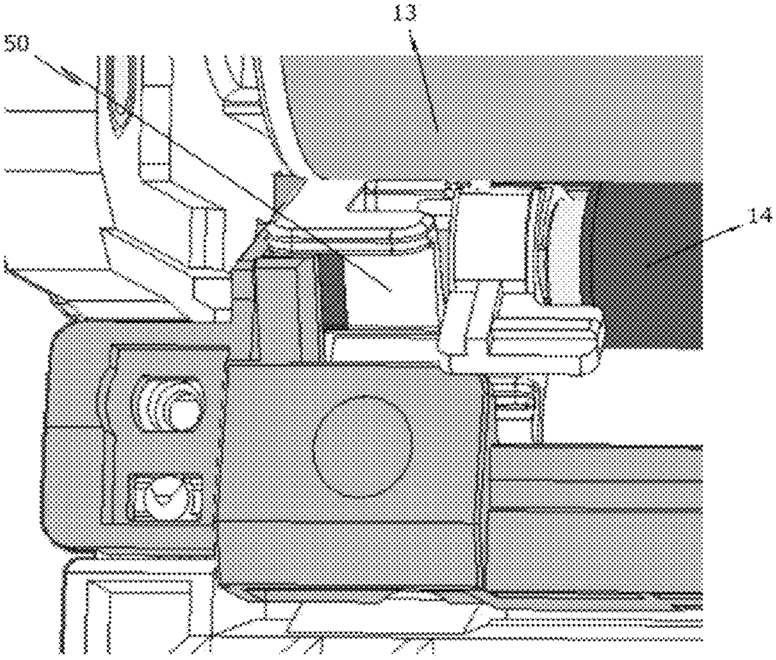
FIGS. 9A and 9B illustrate the position of the separation cam on the front side illustrated in FIG. 5 in a separation removal state.
Figure 9B:
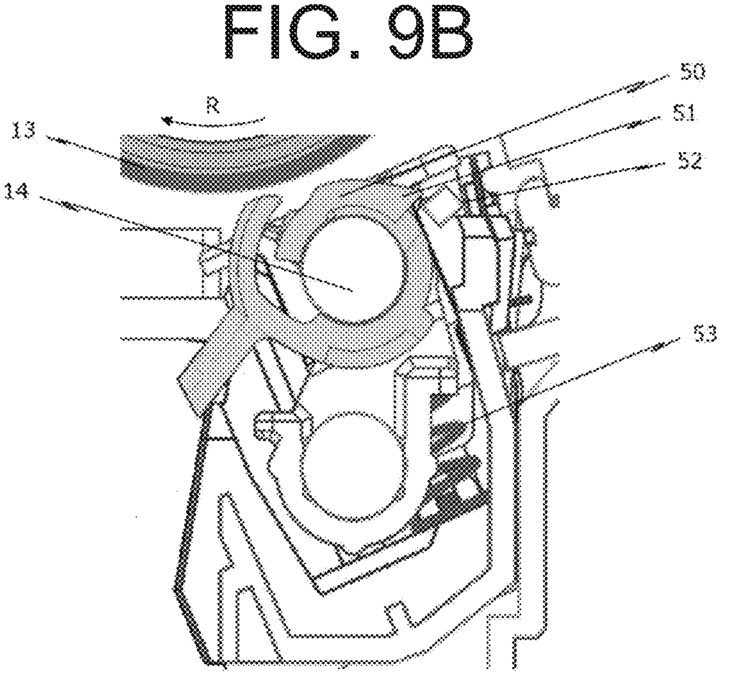

FIGS. 9A and 9B illustrate the position of the separation cam 50 on the front side in the separation removal state. FIGS. 9A and 9B correspond to 7A and 7B.

Figure 10A:
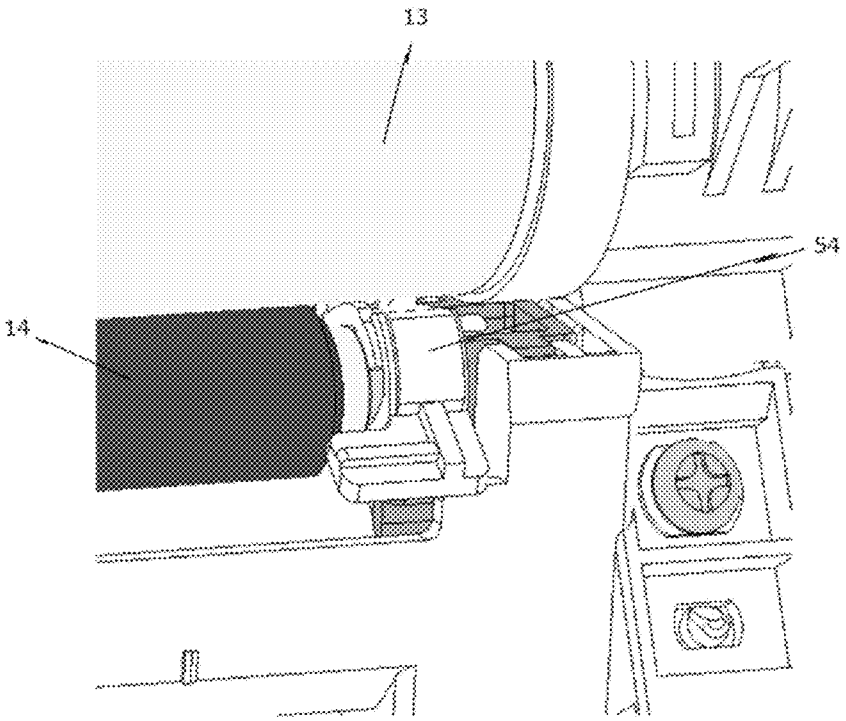
FIGS. 10A and 10B illustrate the position of the separation cam on the rear side illustrated in FIG. 6 in a separation removal state.
Figure 10B:
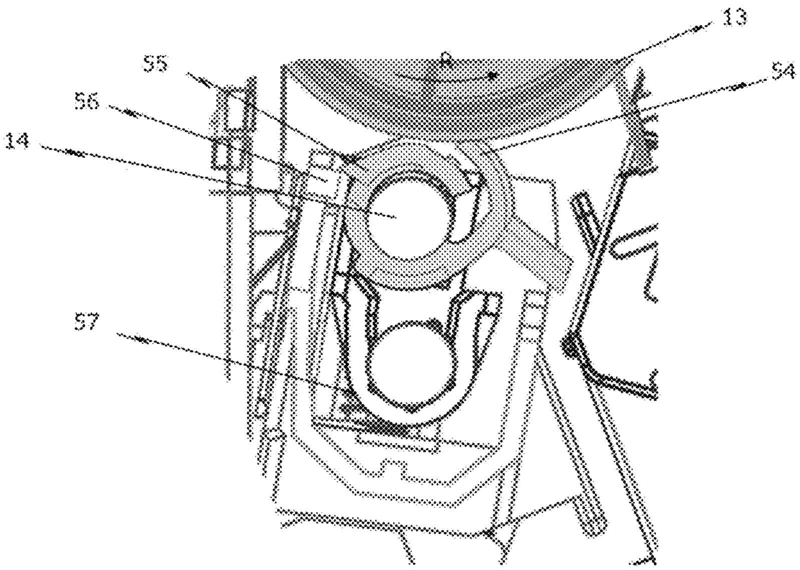

FIGS. 10A and 10B illustrate the position of the separation cam 54 on the rear side in the separation removal state. FIGS. 10A and 10B correspond to FIGS. 8A and 8B.

As illustrated in the cross-sectional views in FIGS. 7B to 10B, the charge roller 14 is biased in a direction to be pressed toward the photosensitive drum 13 by a spring 53 on the front side and by a spring 57 on the rear side. This ensures that the charge roller 14 is in contact with the photosensitive drum 13 during image formation.

As illustrated in FIGS. 7A and 7B, in the initial separate state, the outer end of the separation cam 50 is located between the photosensitive drum 13 and the charge roller 14 in the front ends thereof to function as a spacer that holds the separate state. As illustrated in FIGS. 8A and 8B, the outer end of the separation cam 54 is located between the photosensitive drum 13 and the charge roller 14 in the rear ends thereof to function as a spacer that holds the separate state.

As illustrated in FIGS. 9A to 10B, the photosensitive drum 13 is driven in the direction of arrow R during operation of the image forming process. When the photosensitive drum 13 is driven in the direction of the arrow R, the frictional force between the photosensitive drum 13 and the outer ends of the separation cams 50 and 54, which are in contact with the photosensitive drum 13, causes the separation cams 50 and 54 to rotate together with the photosensitive drum 13. Accordingly, the outer ends of the separation cams 50 and 54 move away from the position between the photosensitive drum 13 and the charge roller 14, and the charge roller 14 is pushed by the springs 53 and 57 to be in contact with the photosensitive drum 13. That is, the new process unit 30 in the separate state is mounted on the main body of the image-forming apparatus, and when the photosensitive drum 13 rotates for the first time, the separate state is removed.

When the separation cam 50 on the front side rotates together with the photosensitive drum 13, the rib 51 moves under the antireverse stopper 52 fixed to the process unit 30 by elasticity. The rib 51 having moved under the antireverse stopper 52 expands outward by elasticity. Therefore, even when the separation cam 50 is subsequently subjected to a rotative force in a direction opposite to the rotation direction, the end of the rib 51 comes into contact with the antireverse stopper 52 and prevents further rotation in the opposite direction.

Therefore, once the separate state is removed, the separation cam 50 dose not return to the position in the separate state again.

Similarly, when the separation cam 54 on the rear side rotates together with the photosensitive drum 13, the rib 55 moves under an antireverse stopper 56 fixed to the process unit 30 by elasticity. The rib 55 having moved under the antireverse stopper 56 expands outward by elasticity. Therefore, even when the separation cam 54 is subsequently subjected to a rotative force in a direction opposite to the rotation direction, the end of the rib 55 comes into contact with the antireverse stopper 56 and prevents further rotation in the opposite direction.

Therefore, once the separate state is removed, the separation cam 54 does not return to the position in the separate state again.

Process of Separation Removal Confirmer

Figure 11:
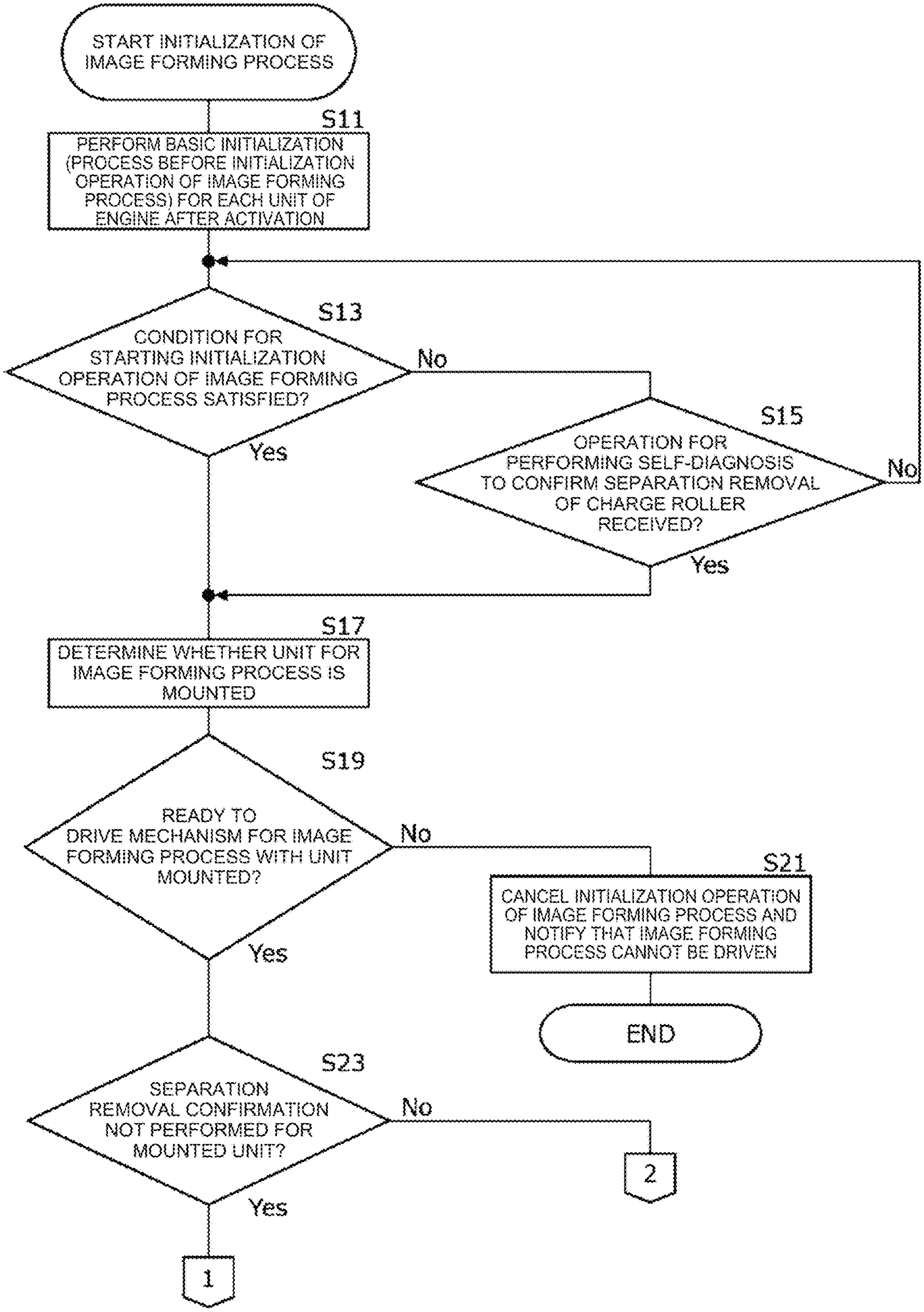
FIG. 11 is a first flowchart illustrating an example of an initialization operation of an image forming process including separation removal confirmation performed by a controller illustrated in FIG. 3.
Figure 12:
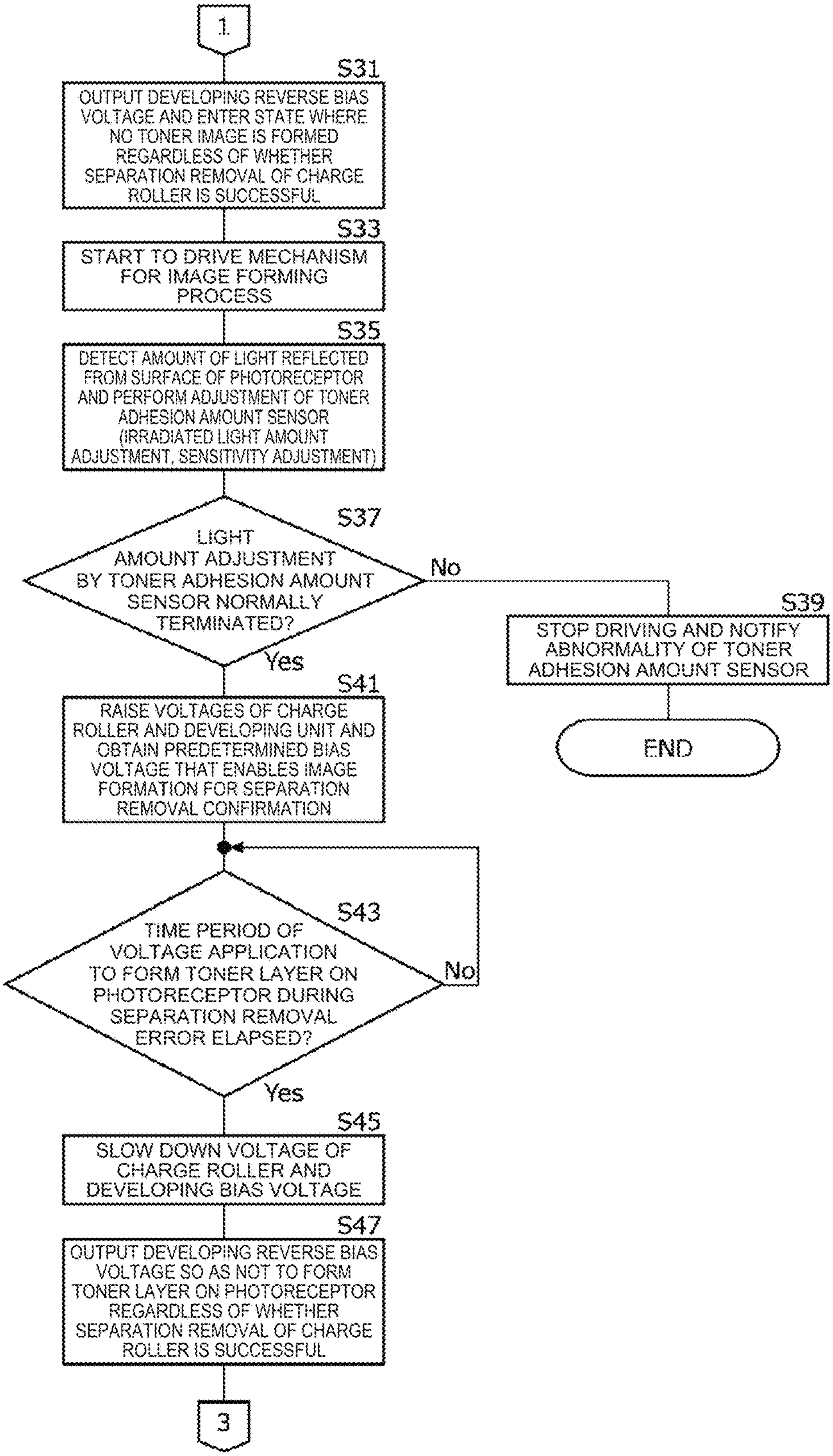
FIG. 12 is a second flowchart illustrating an example of the initialization operation of the image forming process including separation removal confirmation performed by the controller illustrated in FIG. 3.
Figure 13:
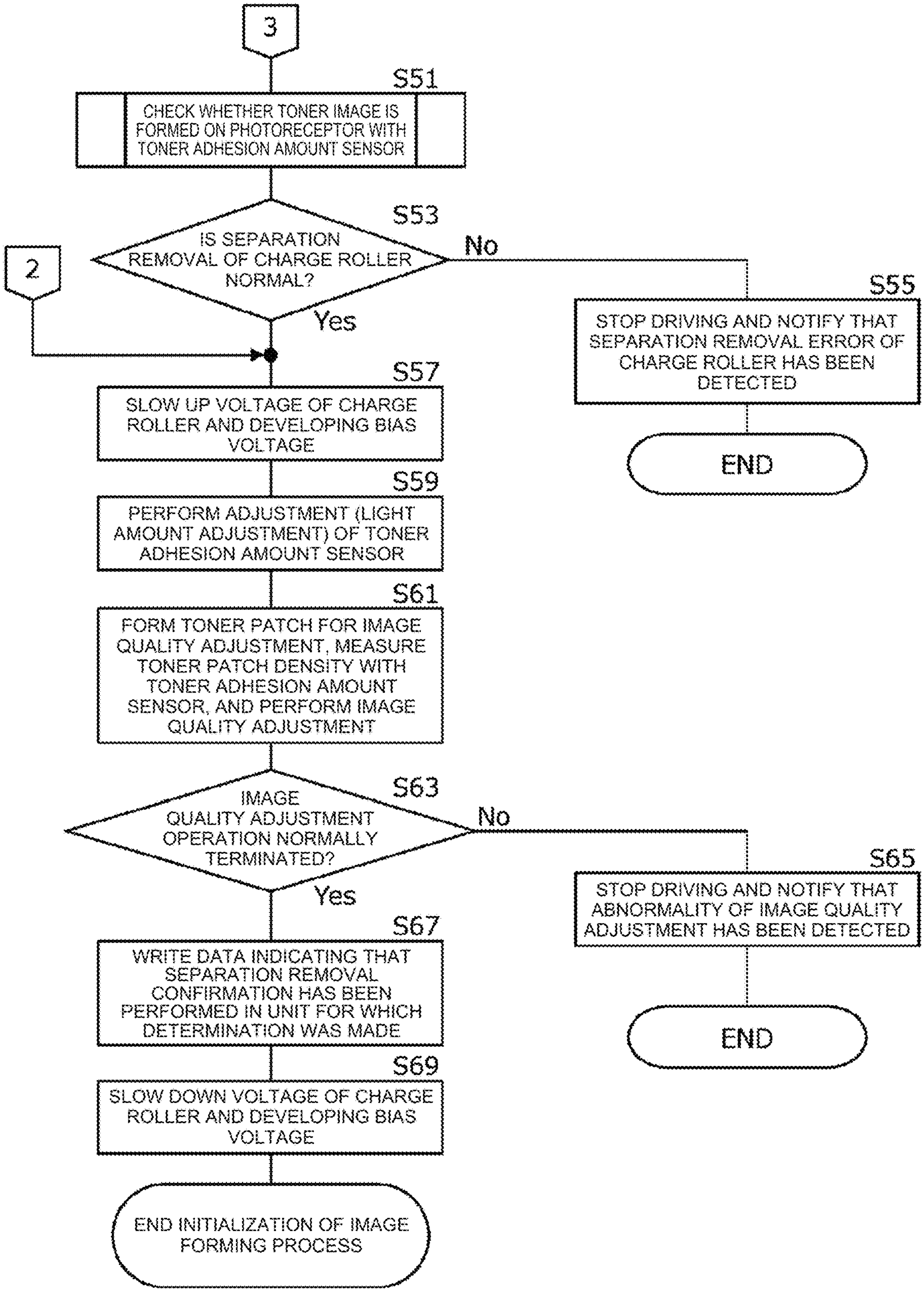
FIG. 13 is a third flowchart illustrating an example of the initialization operation of the image forming process including separation removal confirmation performed by the controller illustrated in FIG. 3.
Figure 14:
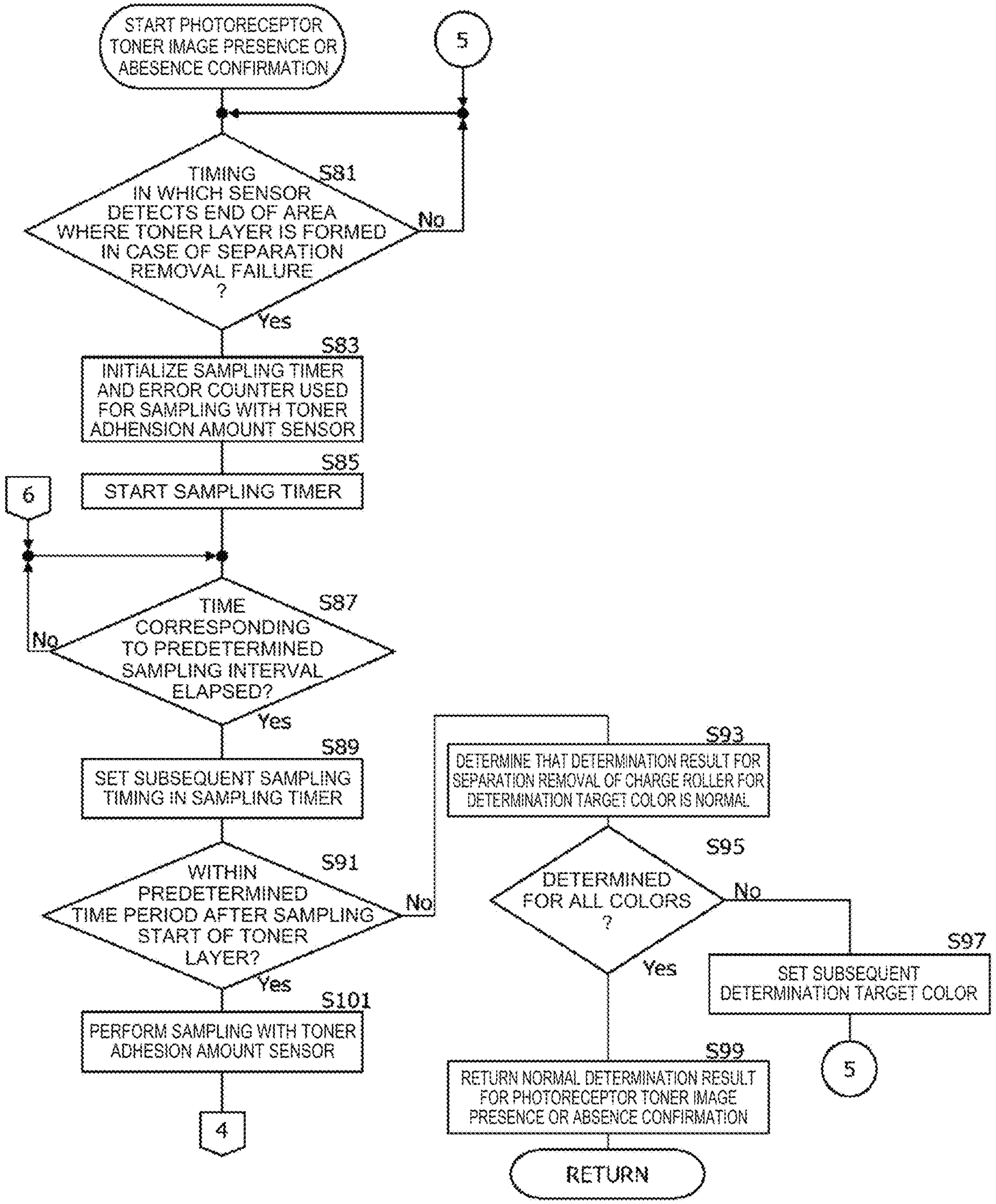
FIG. 14 is a fourth flowchart illustrating an example of the initialization operation of the image forming process including separation removal confirmation performed by the controller illustrated in FIG. 3.
Figure 15:
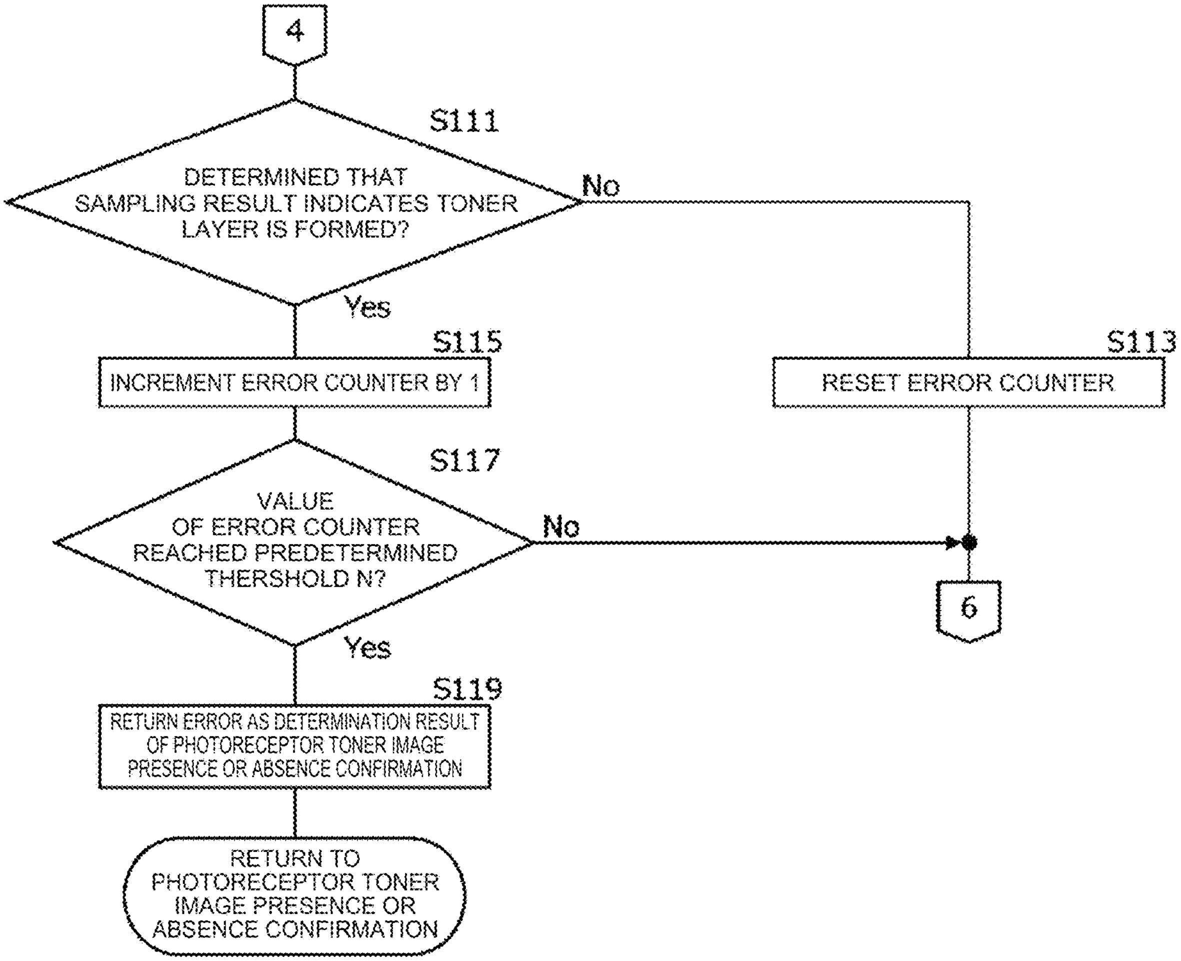
FIG. 15 is a fifth flowchart illustrating an example of the initialization operation of the image forming process including separation removal confirmation performed by the controller illustrated in FIG. 3.

Next, an example of the process performed by the separation removal confirmer will be described with reference to a flowchart. FIGS. 11 to 15 are flowcharts illustrating examples of an initialization operation of the image forming process including separation removal confirmation performed by the controller illustrated in FIG. 3. FIGS. 11 to 13 illustrate the overall flow of the initialization operation of the imaging process, while FIGS. 14 and 15 illustrate the process to confirm whether the photoreceptor is charged, i.e., confirm whether the separation has been removed.

As illustrated in FIG. 11, the controller 110 performs a series of processes described below as the initialization operation for the image forming process after power-on, after return from a power-saving mode, or after replacement of the process unit 30.

First, before driving the devices for the image forming process, the controller 110 performs a basic initialization process before starting the initialization operation of the image forming process (Step S11). For example, it is confirmed whether no signal indicating an error state is output (whether it is normal) from any of high-voltage power supplies that apply bias voltages to the charge roller 14 and the developing unit 12, respectively. Further, it is confirmed whether no signal indicating an error state is output (whether it is normal) from a motor or drive circuit that drives the process unit 30.

After the basic initialization process is finished and the condition for starting the initialization operation of the image forming process is satisfied (Yes in Step S13 after the loop of Yes in Step S13, No in Step S15, and then back to Step S13), the controller 110 confirms whether the process unit 30 is mounted (Step S17). According to the present embodiment, it is assumed that the process unit 30 has a nonvolatile memory mounted thereon, which stores data on the usage history of the photoreceptor included in the process unit 30 and the state regarding whether the separation mechanism is removed. The controller 110 may communicate with the nonvolatile memory mounted on the process unit 30, but when the process unit 30 is unmounted, no communications are enabled, based on which the controller 110 detects whether the process unit 30 is mounted. Alternatively, signals indicating whether the process unit 30 is mounted may be provided, and based on the signals, it may be determined whether the process unit 30 is mounted.

Furthermore, it is detected whether the process unit 30 is mounted when it is not determined whether the condition for starting the initialization operation of the image forming process is satisfied during the determination in Step S13 above (No in Step S13) and when an instruction for executing self-diagnosis is received (Yes in Step S15). This is the case where the instruction for executing self-diagnosis to confirm separation removal of the charge roller 14 is received via the operation acceptor 105 or a communication circuit not illustrated in FIG. 3.

When the process unit 30 is not mounted (No in Step S19), the controller 110 cancels the initialization operation of the image forming process, notifies the user that the initialization operation cannot be started by displaying, for example, on the operation acceptor 105, prompts the user to take action (Step S21), and ends the process.

Conversely, when the controller 110 determines that it is ready to start driving with the process unit 30 mounted (Step S19), the controller 110 then determines whether separation removal confirmation has already been performed for the process unit 30 (Step S23).

When the separation removal confirmation has already been performed, that is, when the process unit 30 is not new (No in Step S23), the controller 110 skips the process of separation removal confirmation by the separation removal confirmer 135 and executes the process of image quality adjustment by the image quality adjuster 131. That is, the controller 110 proceeds to the process in Step S57 illustrated in FIG. 13.

Conversely, when the process unit 30 is new, for which the separation removal confirmation has not yet been performed (Yes in Step S23), the controller 110 performs the following separation removal confirmation process as the separation removal confirmer 135. First, unlike the typical image forming process, a bias voltage (hereinafter also referred to as reverse bias voltage) selected so as not to form any toner images in uncharged and unexposed areas of the photosensitive drum 13 is applied to the developing unit 12 (Step S31 illustrated in FIG. 12). In the typical image forming process, the charged photosensitive drum 13 is selectively exposed and a toner image is formed in the exposed area.

In addition, the controller 110 drives and rotates the photosensitive drum 13 and operates the toner adhesion amount sensor 43 (Step S33). Then, at least any of the amount of light irradiated by the toner adhesion amount sensor 43 and the sensitivity with which the toner adhesion amount sensor 43 detects the reflected light is adjusted so that the amount of light reflected from the surface of the photosensitive drum 13, where no toner image is formed, falls within a predetermined range (Step S35).

The controller 110 then determines whether the amount of light detected by the toner adhesion amount sensor 43 has been adjusted to the above-described predetermined range (whether it is normal) (Step S37). When it is difficult to adjust the amount of detected light to the predetermined range (No in Step S37), the controller 110 stops driving the process unit 30. The abnormality of the toner adhesion amount sensor 43 is then displayed on the operation acceptor 105, for example, and notified to the user to prompt the user to take action (Step S39), and the process is terminated.

Conversely, when the amount of light detected by the toner adhesion amount sensor 43 has been adjusted to the above-described predetermined range (Yes in Step S37), the controller 110 applies bias voltages to the charge roller 14 and the developing unit 12 at predetermined levels that enable image formation (Step S41). Examples of the bias voltages in the typical image forming process are −600 V for the charge roller 14 and −450 V for the developing unit 12. However, in the case of Step S41 described above, the voltage may be lower than that in the typical image forming process so that the density of a solid toner image (which may be simply referred to as a toner layer as it is a solid image) formed in the case of a separation removal failure becomes lower than that in the typical image forming process. Further, the controller 110 applies a bias voltage for transfer to the primary transfer roller 16.

The controller 110 then waits for a predetermined time period to elapse after the bias voltage rises (Step S43) and then lowers the voltage applied to the charge roller 14 and the developing unit 12 (Step S45). The time period for Step S43 is a time period sufficient for the toner layer formed in the case of a separation removal failure to be detected by the toner adhesion amount sensor 43. An example of the desirable time period is any time period belonging to the range of 50 milliseconds to 3 seconds. However, this is an example, and the desirable time period is different depending on the process speed and the performance of the toner adhesion amount sensor.

As the bias voltage after lowering, preferably, the bias voltage for the charge roller 14 is zero, and the bias voltage applied to the developing unit 12 is the reverse bias voltage similar to that in Step S31 above (Step S47).

The controller 110, which serves as the separation removal confirmer 135, waits for the toner layer formed in the case of a separation removal failure to reach the detection area of the toner adhesion amount sensor 43 and detects with the toner adhesion amount sensor 43 whether a toner layer is formed at that position (Step S51 illustrated in FIG. 13). The details of the process illustrated in Step S51 will be described below.

As the photosensitive drum 13 is driven in Step S33 above, the separate state is supposed to have already been removed when the bias voltage rises in Step S41. Therefore, the charge roller 14 is supposed to be in contact with the photosensitive drum 13 and be capable of charging the photosensitive drum 13. No toner images are formed in the area where the photosensitive drum 13 is charged by the charge roller 14 and is unexposed. On the other hand, when a separation removal failure has occurred and the separate state has not been removed, the photosensitive drum 13 is not charged. Therefore, a solid toner image (toner layer) is formed even if it is unexposed.

The controller 110 determines whether the separation removal has been normally performed as a result of the process in Step S51 (Step S53). As a result, when it is determined that a separation removal failure has occurred (No in Step S53), the controller stops driving the process unit. Then, the state where the separate state has not been removed (separation removal failure) is displayed on the operation acceptor 105, for example, and notified to the user to prompt the user to take action (Step S55), and the process is terminated.

Conversely, when it is determined that the separation removal has been normally performed (Yes in Step S53), the controller 110 then performs image quality adjustment as the image quality adjuster 131.

The controller 110, which serves as the image quality adjuster 131, applies the bias voltages to the charge roller 14 and the developing unit 12 at predetermined levels for image quality adjustment (Step S57). Examples of the bias voltages are −600 V for the charge roller 14 and −450 V for the developing unit 12.

Then, as in Step S35 above, the amount of light of the toner adhesion amount sensor 43 is adjusted (Step S59). The optical scanning unit 11 is then used to partially expose the photosensitive drum 13 to form multiple patch images (toner patches) for image quality adjustment, and the toner adhesion amount sensor 43 detects the toner adhesion amounts (densities) of the formed toner patches. Based on the results, the bias voltages to be applied to the charge roller 14 and the developing unit 12 in the subsequent image forming process are determined, and also the intensity of exposure by the optical scanning unit 11 and the tone pattern to be applied are determined (Step S61).

The controller 110 determines whether each step of the image quality adjustment has been normally terminated (Step S63). The determination includes the determination as to whether the adjustment on the light amount in Step S59 above has been normally terminated and the determination as to whether the signal indicating an error state has been output from any of the high-voltage power supplies that apply the respective bias voltages to the charge roller 14 and the developing unit 12 during the execution of image quality adjustment. The determination further includes the determination as to whether the density of each toner patch detected using the toner adhesion amount sensor 43 falls within a predetermined range.

As a result, when it is determined that an abnormality has occurred in the image quality adjustment (No in Step S63), the controller 110 stops driving the process unit. Then, the state where an abnormality has been detected in the image quality adjustment is displayed on the operation acceptor 105, for example, and notified to the user to prompt the user to take action (Step S65), and the process is terminated.

Conversely, when the image quality adjustment has been normally terminated (Step S63), the controller 110 writes the data indicating that the separation removal confirmation has been performed, to the nonvolatile memory included in the process unit 30 that performed the separation removal confirmation (Step S67). Then, the bias voltages applied to the charge roller 14 and the developing unit 12 are lowered (Step S69), and the driving is stopped. The above is an example of the process for the initialization operation of the image forming process.

The details of the process in the above-described Step S51 will be then described. When a toner layer is formed in the area where a toner layer is formed in the case of a separation removal failure, i.e., in the area charged in Steps S41 to S45 above, the controller 110, which serves as the separation removal confirmer 135, waits for the area of the toner layer to reach the detection area of the toner adhesion amount sensor 43 (the loop of No in Step S81). When the area reaches the detection area of the toner adhesion amount sensor 43 (Yes in Step S81), the controller 110 initializes a sampling timer and an error counter used for sampling with the toner adhesion amount sensor 43 to zero (Step S83). Then, after setting a predetermined time corresponding to a sampling interval in the sampling timer, the sampling timer is started (Step S85).

Here, the sampling timer is a timer to ensure a sampling interval. The error counter is a counter that is counted up when the sampled data indicates a separation removal failure, i.e., when each level of consecutive sampled data corresponds to the amount of toner adhesion when a toner layer is formed.

The controller 110 waits for the sampling timer to time up (the loop of No in Step S87). When the sampling timer times up (Yes in Step S87), the controller 110 sets a predetermined time corresponding to the sampling interval in the sampling timer and then starts the sampling timer (Step S89). It is then determined whether it is within the predetermined time period after the sampling started (Step S91). The time period for the determination in Step S91 corresponds to the time period for the process in Step S43 described above. That is, the time period is a time period during which the toner adhesion amount sensor 43 detects the toner layer formed in the case of a separation removal failure. Furthermore, the time period does not need not be exactly the same as the time period in Step S43 above in consideration of the spread of the detection area of the toner adhesion amount sensor and the error in the mounting position of the charge roller 14.

When it is not within the predetermined time period in the aforementioned determination in Step S91 (No in Step S91), it is determined that the separation removal of the charge roller 14, corresponding to the color subject to the determination, has been normally performed (Step S93), because no toner layer is detected since elapse of the predetermined time period after the sampling started. Then, the controller 110 determines whether the separation removal of the charge rollers 14, corresponding to the respective colors, is determined to have been normally performed (Step S95). As a result, when it is determined that the separation removal of all of the charge rollers 14, corresponding to the respective colors, has been normally performed (Yes in Step S95), "normal", i.e., no separation removal failure, is returned as a determination result of separation removal confirmation (Step S99). On the other hand, when it is determined that the separation removal of any out of the charge rollers 14, corresponding to the respective colors, has not been normally performed (No in Step S95), a color to be subject to the next determination is set (Step S97), and the control is returned to the determination in Step S81. Note that the above-described steps correspond to control in the case of a color multifunction peripheral; and in the case of a monochrome multifunction peripheral, the processes in Steps S93, S95, and S97 are omitted.

When it is within the predetermined time period as a result of the determination in Step S91 above (Yes in Step S91), the controller 110 performs sampling of the toner adhesion amount with the toner adhesion amount sensor 43 (Step S101). It is then determined whether the sampling result indicates that a toner layer has been formed (Step S111 in FIG. 15). That is, it is determined whether it is such a level that the toner is adhering. The formation of a toner layer indicates that the photosensitive drum 13 is not charged, i.e., a separation removal failure. In that case, the controller 110 adds (increments) the value of the error counter by one (Step S115). It is then determined whether the value of the error counter has reached a predetermined threshold N (N is a natural number) (Step S117).

When the error counter has reached the threshold N (Yes in Step S117), that is, when all the N consecutive sampling data indicate a separation removal failure, an error (the presence of a separation removal failure) is returned as a determination result of the separation removal confirmation (Step S119).

Conversely, when the sampling result indicates such a level that no toner is adhering during the determination in Step S111 above (No in Step S111), the controller 110 resets the value of the error counter to zero (Step S113). Thus, when there is no consecutive sampling data indicating a separation removal failure, the previous errors are not accumulated.

The controller 110 then returns the process to the determination in Step S87 illustrated in FIG. 14 and waits for the next sampling timing.

When the value of the error counter has not reached the predetermined threshold N during the determination in Step S117 above (No in Step S117), the controller 110 also returns the process to the determination in Step S87 illustrated in FIG. 14 and waits for the next sampling timing.

The above is the details of the process of Step S51 illustrated in FIG. 13, i.e., the process of determining whether there is a separation removal failure.

Second Embodiment

According to the first embodiment, the flowcharts illustrated in FIGS. 11 to 15 illustrate the process for the one process unit 30. However, in the case of the color multifunction peripheral illustrated in FIGS. 1 to 3, there are the four process units 30 corresponding to the colors Y, M, C, and K. In that case, the controller 110 performs separation removal confirmation for each of the Y, M, C, and K colors.

As described above, (i) an image-forming apparatus according to one aspect of the present disclosure includes a charge device that comes into contact with a photoreceptor for an image forming process and charges the photoreceptor in a state where a voltage is applied, a separation mechanism that holds the photoreceptor and the charge device in a separate state that is removable, an exposure device that exposes the photoreceptor, a developing device that forms a toner image on a surface of the photoreceptor in a state where a voltage is applied, a toner adhesion amount sensor that detects a toner image formed on the surface of the photoreceptor to adjust an image quality, an image quality adjuster that controls a voltage applied to the charge device, a voltage applied to the developing device, an amount of light during exposure with the exposure device, and detection of the toner image and a density of the toner image with the toner adhesion amount sensor, and a separation removal confirmer that, with the toner adhesion amount sensor, detects whether a toner image is formed in spite of unexposure in a state where a voltage is applied to the charge device and the developing device during an initialization operation of the image forming process at a start time of use to thus perform separation removal confirmation as to whether the separate state by the separation mechanism has been removed.

According to one aspect of the present disclosure, the charge device comes into contact with the photoreceptor to charge the photoreceptor. Examples of the specific form thereof include the transfer roller according to the above-described embodiment.

The photoreceptor is used for electrophotographic image formation. Examples of the specific form thereof include the photosensitive drum according to the above-described embodiment. The photosensitive drum is a cylinder having a photoreceptor formed on its circumference. However, the photoreceptor is not limited to a cylindrical one. For example, the photoreceptor may be shaped like a belt.

The toner adhesion amount sensor is a sensor to detect a toner patch formed on the image carrier. The toner adhesion amount sensor is a reflective optical sensor that uses a pair of a light emitting element and a light receiving element to detect the toner adhesion amount of the toner image on the image carrier.

Examples of the specific forms of the image quality adjuster and the separation removal confirmer include a form that primarily includes a processor and a memory, in which the processor executes a processing program stored in the memory, as in the above-described embodiment.

A description will be further given for preferable aspects of the present disclosure. (ii) The separation removal confirmer may perform the separation removal confirmation during the initialization operation of the image forming process at the start time of use, when it is determined that the separate state has been removed, the separation removal confirmer may omit the separation removal confirmation until at least any of the photoreceptor and the charge device is replaced, and the image quality adjuster may determine whether a device for the image forming process is normal and continue the initialization operation of the image forming process, and when it is determined that the separate state has not been removed, or when the image quality adjuster determines that any device for the image forming process is not normal, the separation removal confirmer may perform the separation removal confirmation again during the initialization operation of a subsequent image forming process.

According to this aspect, when separation removal is confirmed and it is determined that the device for the image forming process is normal, the separation removal confirmer omits the subsequent separation removal confirmation until the device for the determination is replaced, but does not omit the subsequent separation confirmation when the separation removal is not confirmed or it is determined that the device is abnormal; thus, it is possible to further ensure that improper determination for the separation removal confirmation is avoided as compared with the case where the separation removal confirmation is not associated with device abnormality.

(iii) The continued initialization operation of the image forming process may be image quality adjustment by forming a toner image for image quality adjustment, detecting the toner image and a density of the toner image with the toner adhesion amount sensor, and adjusting at least any of the voltage applied to the charge device, the voltage applied to the developing device, and the amount of light during exposure with the exposure device.

According to this aspect, image quality adjustment with the photoreceptor charged is executed after separation removal is confirmed.

(iv) The toner adhesion amount sensor may include a plurality of toner adhesion amount sensors located at one or more different locations in a main scanning direction in which the exposure device exposes the photoreceptor to detect the toner image on the surface of the photoreceptor or in a path along which the formed toner image is fed.

(v) The image quality adjuster may determine whether at least any of the following is normal: the toner adhesion amount sensor, the voltage applied to the charge device, the voltage applied to the developing device, the photoreceptor, a path along which the formed toner image is fed, a toner storage unit containing toner supplied to the developing device, and a drive source for image formation.

(vi) A plurality of photoreceptors, charge devices, and separation mechanisms corresponding to different colors may be included, and the separation removal confirmer may perform the separation removal confirmation for each of the colors.

According to this aspect, when a plurality of separation mechanisms corresponding to different colors is provided, separation removal confirmation may be performed for each separation mechanism.

(vii) The photoreceptor and the charge device may be provided as a process unit that is capable of being mounted and replaced as a single unit, and the process unit may include a mechanism that enables a main body side, on which the process unit is mounted, to detect whether the process unit is an unmounted new unit or a used old unit, or a nonvolatile memory in which the main body side is capable of reading and writing data indicating whether the process unit is a new unit or an old unit.

According to this aspect, it is possible to ensure that the main body side recognizes the unmounted and new process unit and the old process unit that has been mounted once and used.

(viii) The process unit may include the nonvolatile memory, and when the separation removal confirmation has been normally terminated, the separation removal confirmer may write data indicating that the separation removal confirmation has been performed, to the nonvolatile memory of the process unit.

According to this aspect, the data indicating that the separation removal confirmation has been performed is written to the nonvolatile memory of the process unit so that it is possible to ensure that the main body side recognizes the state of each process unit.

The aspect of the present disclosure includes the combination of any of the above-described aspects.

Various modifications of the present disclosure may be made in addition to the above-described embodiments. It should not be understood that such modifications do not fall within the scope of the present disclosure. The present disclosure should include equivalents of the scope of claims and all the modifications within the scope.

What is claimed is:

1. An image-forming apparatus comprising:

a charge device that comes into contact with a photoreceptor for an image forming process and charges the photoreceptor in a state where a voltage is applied;

a separation mechanism that holds the photoreceptor and the charge device in a separate state that is removable;

an exposure device that exposes the photoreceptor;

a developing device that forms a toner image on a surface of the photoreceptor in a state where a voltage is applied;

a toner adhesion amount sensor that detects a toner image formed on the surface of the photoreceptor to adjust an image quality;

an image quality adjuster that controls a voltage applied to the charge device, a voltage applied to the developing device, an amount of light during exposure with the exposure device, and detection of the toner image and a density of the toner image with the toner adhesion amount sensor; and a separation removal confirmer that, with the toner adhesion amount sensor, detects whether a toner image is formed in spite of unexposure in a state where a voltage is applied to the charge device and the developing device during an initialization operation of the image forming process at a start time of use to thus perform separation removal confirmation as to whether the separate state by the separation mechanism has been removed.

2. The image-forming apparatus according to claim 1, wherein the separation removal confirmer performs the separation removal confirmation during the initialization operation of the image forming process at the start time of use, when it is determined that the separate state has been removed, the separation removal confirmer omits the separation removal confirmation until at least any of the photoreceptor and the charge device is replaced, and the image quality adjuster determines whether a device for the image forming process is normal and continues the initialization operation of the image forming process, and when it is determined that the separate state has not been removed, or when the image quality adjuster determines that any device for the image forming process is not normal, the separation removal confirmer performs the separation removal confirmation again during the initialization operation of a subsequent image forming process.

3. The image-forming apparatus according to claim 1, wherein the continued initialization operation of the image forming process is image quality adjustment by forming a toner image for image quality adjustment, detecting the toner image and a density of the toner image with the toner adhesion amount sensor, and adjusting at least any of the voltage applied to the charge device, the voltage applied to the developing device, and the amount of light during exposure with the exposure device.

4. The image-forming apparatus according to claim 1, wherein the toner adhesion amount sensor includes a plurality of toner adhesion amount sensors located at one or more different locations in a main scanning direction in which the exposure device exposes the photoreceptor to detect the toner image on the surface of the photoreceptor or in a path along which the formed toner image is fed.

5. The image-forming apparatus according to claim 1, wherein the image quality adjuster determines whether at least any of the following is normal: the toner adhesion amount sensor, the voltage applied to the charge device, the voltage applied to the developing device, the photoreceptor, a path along which the formed toner image is fed, a toner storage unit containing toner supplied to the developing device, and a drive source for image formation.

6. The image-forming apparatus according to claim 1, further comprising a plurality of photoreceptors, charge devices, and separation mechanisms corresponding to different colors, wherein the separation removal confirmer performs the separation removal confirmation for each of the colors.

7. The image-forming apparatus according to claim 2, wherein the photoreceptor and the charge device are provided as a process unit that is capable of being mounted and replaced as a single unit, and the process unit includes a mechanism that enables a main body side, on which the process unit is mounted, to detect whether the process unit is an unmounted new unit or a used old unit, or a nonvolatile memory in which the main body side is capable of reading and writing data indicating whether the process unit is a new unit or an old unit.

8. The image-forming apparatus according to claim 7, wherein the process unit includes the nonvolatile memory, and when the separation removal confirmation has been normally terminated, the separation removal confirmer writes data indicating that the separation removal confirmation has been performed, to the nonvolatile memory of the process unit.

* * * * *